United States Patent [19]
Sugiyama et al.

[11] Patent Number: 5,118,002
[45] Date of Patent: Jun. 2, 1992

[54] EASY-OPENING CONTAINER PACKAGING

[75] Inventors: Takuji Sugiyama, Shizuoka; Shigeru Ito, Shimizu; Tetsuro Ichikawa, Shizuoka, all of Japan

[73] Assignee: Sun A. Chemical Industries Co., Ltd., Tokyo, Japan

[21] Appl. No.: 543,886

[22] Filed: Jun. 27, 1990

[30] Foreign Application Priority Data

Jun. 27, 1989 [JP] Japan .................. 1-164194
Dec. 20, 1989 [JP] Japan .................. 1-330140

[51] Int. Cl.$^5$ ............................. B65D 41/00
[52] U.S. Cl. ................. 220/359; 220/270; 220/276; 220/461
[58] Field of Search .......... 220/270, 276, 359, 461; 215/232, 256; 229/125.35, 123.1

[56] References Cited

U.S. PATENT DOCUMENTS

| | | | |
|---|---|---|---|
| 3,290,856 | 12/1966 | Rumberger | 229/125.35 X |
| 4,589,568 | 5/1986 | Ito et al. | 220/359 |
| 4,595,117 | 6/1986 | Walter | 220/359 |
| 4,689,099 | 8/1987 | Ito et al. | 156/69 |
| 4,771,935 | 9/1988 | Hekal | 229/3.5 R |
| 4,801,041 | 1/1989 | Takata et al. | 220/359 |
| 4,858,780 | 8/1989 | Odaka et al. | 220/359 |
| 4,865,217 | 9/1989 | Yoshimoto | 220/359 |
| 4,905,838 | 3/1990 | Suzuki et al. | 206/631 |
| 4,913,307 | 4/1990 | Takata et al. | 220/276 |

FOREIGN PATENT DOCUMENTS 0238451  5/1962  Australia ............... 220/359

Primary Examiner—Stephen P. Garbe
Assistant Examiner—Stephen Cronin
Attorney, Agent, or Firm—Kanesaka and Takeuchi

[57] ABSTRACT

A container packaging having a flanged container, and a cover member with which the container is tightly closed by heat sealing at the flange after being filled with a content stuff. This packaging can be easily opened to take out the content by separating the cover member with a human hand force in such a manner that as an end of the cover member is pulled upward, ply separation of a cohesion-destructive plastic layer progresses, or a portion of an outer peripheral threadlike protrusion reduced in thickness is broken and ply separation of cohesion-destructive plastic layer thereafter progresses to the position of an inner peripheral threadlike protrusion, and a portion of this protrusion reduced in thickness is broken.

4 Claims, 8 Drawing Sheets

EASY-OPENING CONTAINER PACKAGING

BACKGROUND OF THE INVENTION

This invention relates to an easy-opening container packaging used in the industry of sealingly packing food.

Easy-opening container packagings tightly closed by heat seal and capable of being opened by ordinary human hand force are known.

This kind of easy-opening container packaging includes a type of sealed packaging having a seal provided between a cover member and a container formed of, for example, polyvinyl chloride, polyethylene, polyester, polypropylene, polycarbonate or the like. The seal is formed in such a manner that a hot melt bonding agent consisting of a mixture of, for example, an ethylene-vinyl acetate copolymer plastic, rosin, and a material such as polyterpene resin for providing adhesive properties or a petroleum wax, or a heat seal lacquer formed by dissolving in a suitable solvent a compound blended so as to have suitable peeling properties after heat sealing is coated to the cover base and is dried to form a film. Another type of sealed packaging is known in which a container formed of a suitable material is closed by heat sealing with a cover member to which an easy-peeling sealant film is bonded by a dry lamination method using a bonding agent. This easy-peeling sealant film is formed in such a manner that a sealant resin devised to be easy to peel off after heat sealing is converted to a film by an extrusion lamination or extrusion casting apparatus based on a method commonly used in this industrial field.

Techniques have been proposed which improve the heat seal strength to achieve a seal strength of 2.3 kg/15 mm or larger which satisfies the standard of retort food containers in conformity with the law (in Japan) while making the container easy to open.

For example, Japanese Patent Laid-Open No.62-251363 discloses a method in which an innermost layer plastic film of an easy-peeling sealant provided in association with an adjacent layer plastic is partially cut so that the innermost layer can be peeled from outer layers at the interface with the adjacent layer.

However, an easy-opening container based on this method has a layer-exfoliation structure such that the innermost layer of the easy-peeling sealant is peeled from the adjacent plastic film at the interface therebetween, so that the desired effects cannot be achieved unless the innermost layer plastic film is cut to a substantial extent, and cut waste pieces are formed when the innermost layer plastic film is cut, and there is therefore a risk of the waste pieces being mixed in the content food. It is difficult to completely remove such waste pieces.

Moreover, it is not possible to form a slit having a uniform thickness in a peripheral portion of the flange because of the non-uniformity of the thickness of the multilayer plastic sheet, resulting in dispersion of the peeling strength.

The strength of a heat seal between the cover member and the container of the ordinary easy-opening packaging is set to a value within a range of about 0.5 to 1.5 kg/15 mm such that the cover can be suitably separated by an ordinary human hand force.

Various techniques for increasing the heat seal strength above a certain level, e.g., 2.3 kg/15 mm which is the standard value of retort food containers in conformity with the law (in Japan) while achieving desired easy-opening properties are known which include methods relating to the compositions of the constituent materials and methods using the above described type of structure in which the innermost layer plastic film is cut. However, all the known methods are unsatisfactory because the heat sealing conditions are restricted or because the resulting sealing performance is inferior in stability. Also, in the conventional structures, the kinds of material and the use of materials are limited. That is, polypropylene, heat resistant polyester or the like cannot be used and only high density polyethylene can be used; the temperature at which the packaging is heated for retort sterilization is at most 120° C. Further, because a particular means such as a notch in the flange is required, the width of the flange becomes unnecessarily large, which is undesirable in terms of appearance and cost. An ideal construction of easy-opening packaging is such that, for separation of the heat-sealed cover member from the container, the seal strength against an opening force applied from the outside of the flange is reduced to facilitate opening while the seal strength against a force applied from the inside of the flange or from the position of the content stuff is maximized for protection of the content stuff. In other words, it is necessary to increase the difference between the seal strengths with respect to the directions of application of opening forces from the inner and outer peripheries of the flange. Some of the conventional techniques are proposed in view of this point but they entail the above-mentioned drawbacks.

SUMMARY OF THE INVENTION

It is an object of the present invention to provide an ideal easy-opening container packaging free from the problems of the prior art, capable of retort sterilization at 120° C. or higher, having a seal strength equal to or higher than 2.3 kg/15 mm which is a legal standard value of retort food containers (in Japan), and capable of being suitably opened by an aged person or a child.

An easy-opening container packaging in accordance with the present invention has suitable easy-opening properties such that the packaging can be easily opened by a force applied from the outside of the flange while it cannot be easily opened by a force applied from the inside of the flange or from the position of the content stuff since it has a large seal strength against a force applied in this direction. It is thus improved in seal protecting performance. In this packaging, there is no possibility of formation of cut waste pieces which problem is encountered in the case of the conventional easy-opening packagings, while the desired breaking opening effects can be obtained based on formation of a portion of a flange uniformly reduced in thickness without being influenced by the non-uniformity of the flange thickness.

Since the cover member sealant and the container flange are sealed by fusion-bond sealing, the packaging of the present invention is improved in the impurity sealing properties.

Peeling for opening the packaging is based on film ply separation of the cohesion-destructive film. The sealing condition range is therefore wide and the resulting sealing strength can be maintained with stability.

If the present invention is applied to containers having high heat resistance, e.g., polypropylene or polyester containers, a legal retort food standard can be satisfied. The present invention is of wide application; it can also be applied to polystyrene or polyethylene containers.

BRIEF DESCRIPTION OF THE DRAWINGS

FIGS. 1—1 and 1—2 are enlarged cross-sectional views of multilayer sheets;

FIGS. 2—1 and 2—2 are cross-sectional views of containers having flanges worked to form protrusions;

FIGS. 3—1 and 3—2 are enlarged cross-sectional views of the protrusions in heat-pressed states;

FIGS. 4—1A, 4—2A, 4—1B, 4—2B, 4—2E are plane views of containers of the present invention;

FIG. 4—2C is a cross-sectional view of a container with a rib;

FIG. 4—2D is a cross-sectional view of a container with a curl;

FIGS. 7—1 and 7—2 are longitudinal front views of formation of a packing member;

FIGS. 9—1A, 9—2A, and 9—2C are enlarged diagrams of sealed portions in fusion-bonded states; and FIGS. 9—1B and 9—2B are enlarged front views of the sealed portions separated after fusion bonding.

DESCRIPTION OF THE PREFERRED EMBODIMENT

One type of a container having a flange which is formed on its outer periphery and which is fusion-bonded to a cover member is constructed to achieve the above described object of the present invention. The container in accordance with the present invention has a plastic film formed of an outermost layer or an uppermost layer on the flange having a film ply strength of 2.5 kg/15 mm or larger, add an easy-peeling plastic sealant adjacent to the innermost plastic film, which is fusion bonded to the same and has having cohesion-destructive properties and having a film ply strength of 0.3 to 2.0 kg/15 mm. The innermost plastic layer of an inner annular portion of the flange forming an upper surface of the flange is continuously reduced in thickness. The portions of the cover member and the container fusion-bonded to each other are spaced apart by at least 1 to 2 mm from the portion of the flange reduced in thickness.

Another type of a container is constructed which has a rib or a curled portion downwardly extending from the outer end of the container flange. In this container, two annular threadlike protrusions upwardly protruding are formed on inner and outer peripheral portions of the flange.

The film ply strength is measured as described below. A film having a thickness of 50 μm is formed from the plastic material for each layer by an extrusion casting apparatus. Each film thereby formed and an oriented nylon film having a thickness of 15 μm are applied to each other by a dry lamination method using an adhesive commonly used in this industrial field to form a sample. Sealing surfaces of this sample are fusion-bonded to each other by using a hot plate sealer, and the peeling resistance of the film interface is measured as film ply strength under the conditions of a test width of 15 mm, a tensile speed 300 mm/min and a peeling angle of 90°.

The present invention will be described below with reference to the accompanying drawings.

Figure 11:
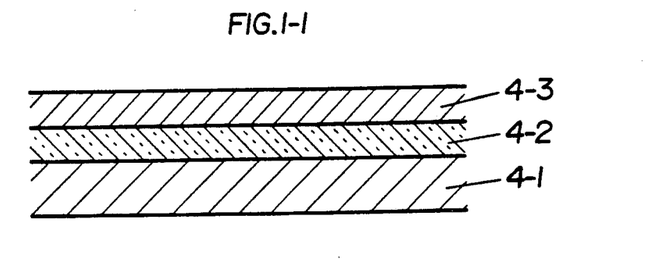
Figure 12:
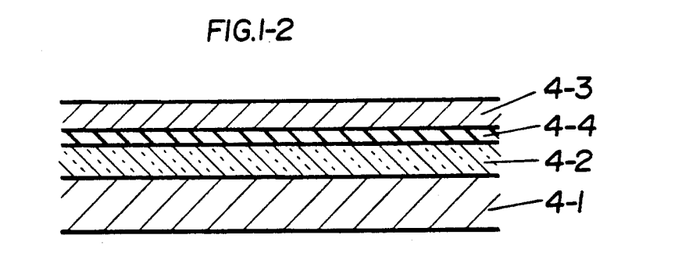

FIGS. 1—1 and 1—2 show cross-sections of multilayer sheets from which a container 1 of the present invention is formed. In the structure shown in FIG. 1—1, a cohesion-destructive plastic 4—2 and a non-cohesion-destructive plastic film 4—3 are fusion-bonded to a container base member 4-1. In the structure shown in FIG. 1—2, a cohesion-destructive plastic 4-2 is fusion-bonded to a container base member 4-1, and a non-cohesion-destructive plastic film 4-3 is bonded to the cohesion-destructive plastic 4-2 by a bonding layer resin 4-4.

A barrier film, e.g., a vinylidene chloride film, an ethylene-vinyl alcohol copolymer film or foil such as aluminum foil, may be interposed between the base layer 4-1 and the intermediate layer 4-2.

Figure 21:
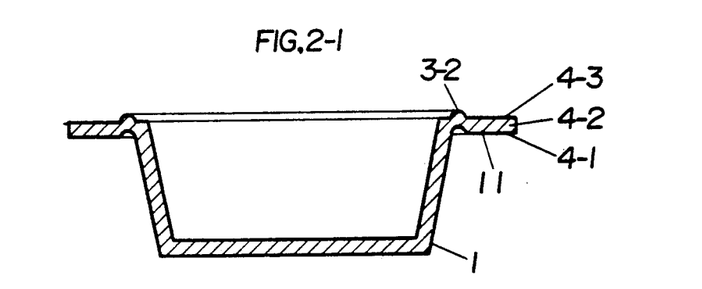
Figure 22:
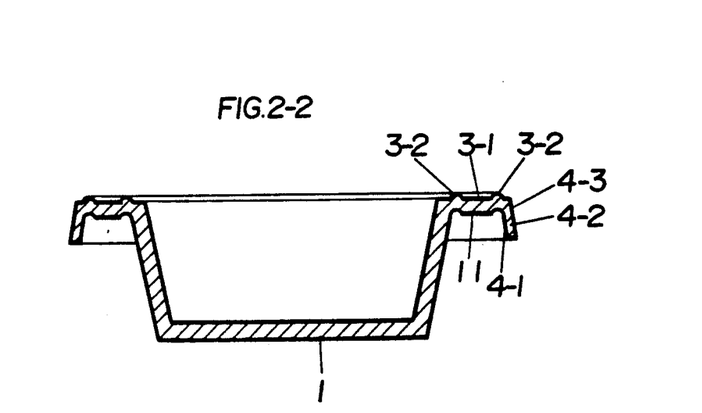

The container 1 in accordance with the present invention is formed of these multilayer sheets as described below. First, as shown in FIGS. 2—1 and 2—2, the container 1 is formed with a flange 11 having an inner annular portion 3-1 on which one or two threadlike protrusions 3-2 are formed such that the base member 4-1 forming the outer surface of the container is recessed while the innermost layer 4-3 is protruded.

The size of the threadlike protrusion 3-2 may be selected as desired. Ordinarily, it is suitable to set the width to about 1 mm and the height to about 1 mm.

For formation of the container 1, a forming means for thermoforming such as vacuum forming or pressure forming is used.

The position of the threadlike protrusion 3-2 is, preferably, at a distance of about 1 mm from the inner peripheral end of the flange 11 defining the opening of the container 1.

In the case where two threads of protrusions 3-2 are formed on the container flange 11, the upwardly protruding annular threadlike protrusions 3-2 are formed in the vicinity of the inner and outer peripheral ends of the heat seal flange 11, that is, preferably, they are formed at the same positions as the inner and outer ends of the flange 11 or at a distance of about 1 mm from the same.

For the two threadlike protrusions 3-2 formed on the container flange 11, the outer peripheral protrusion 3-2 may be replaced with a pair of protruding portions 11a formed in opposite positions on the flange 11, as shown in FIG. 4—2E, while the inner peripheral protrusion 3-2 is formed so as to make a round.

Figure 31:
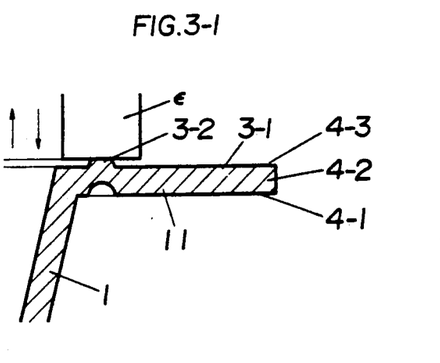
Figure 32:
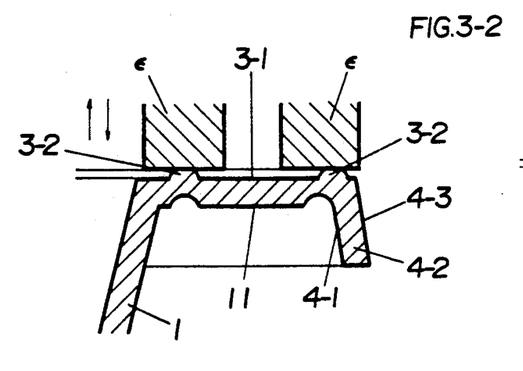

Next, as shown in FIGS. 3—1 and 3—2, protruding ends of the threadlike protrusions 3-2 on the innermost layer plastic surface 4-3 of the inner annular portion 3-1 of the flange 11 are heat-pressed with a heat impressing die ε to reduce the thickness of the innermost plastic film layer 4-3 at the corresponding positions.

The suitable minimum thickness of the innermost layer plastic surface 4-3 at the protrusions 3-2, which depends upon the kind of the plastic material is, for example, 15 μm or, more preferably, 5 to 10 μm in the case of polypropylene.

The shape of the container 1 of the present invention is selected from various types, including round types such as those shown in FIGS. 4—1A and 4—2A, rectangular types such as those shown in FIGS. 4—1B and 4—2B, and an elliptical type such as that shown in FIG. 4—2E. In each of these FIGS., the flange 11 formed on the outer periphery of the opening of the container 1 is illustrated together with a thinner portion 3-2a of the uppermost (innermost) plastic layer obtained by heat-pressing the uppermost layer threadlike protrusion 3-2 provided on the inner annular portion 3-1 which is not reduced in thickness.

The method of reducing the thickness of the container 1 or a cover member 2 at a predetermined position is as described below.

Figures 1A, 4:
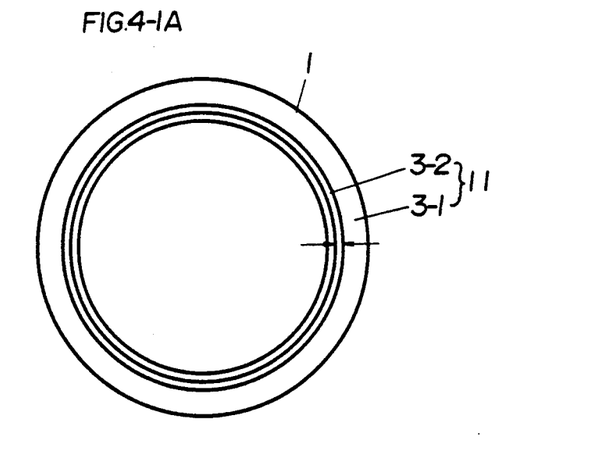
Figures 1A, 9:
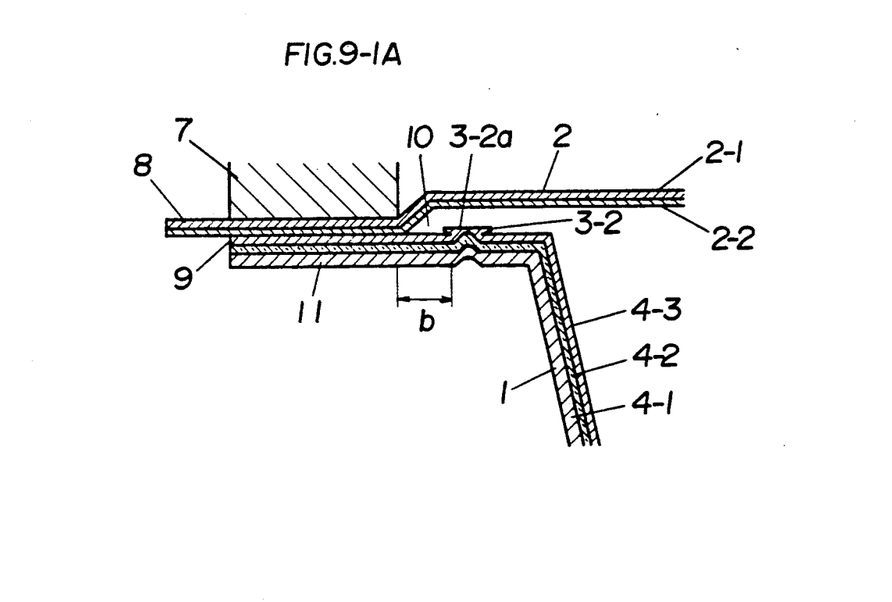
Figures 1B, 4:
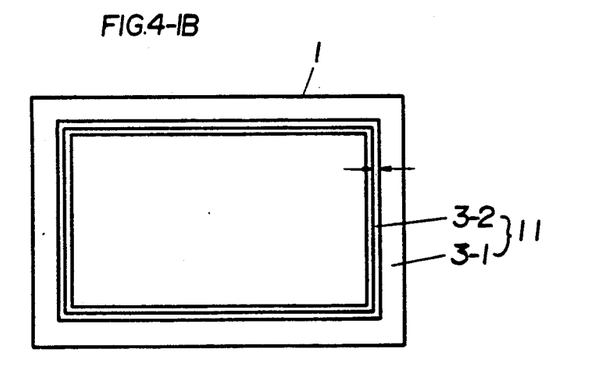
Figures 1B, 9:
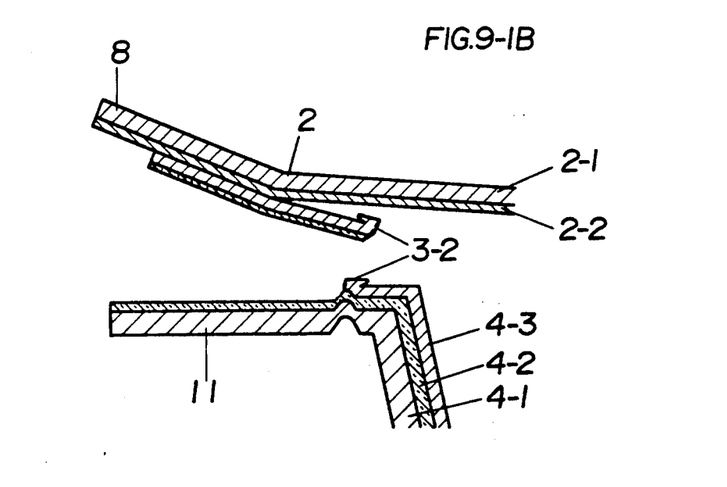
Figures 2A, 4:
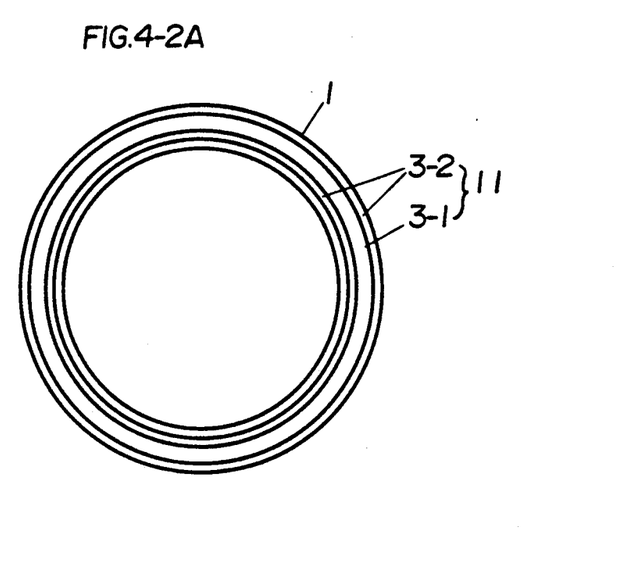
Figures 2A, 9:
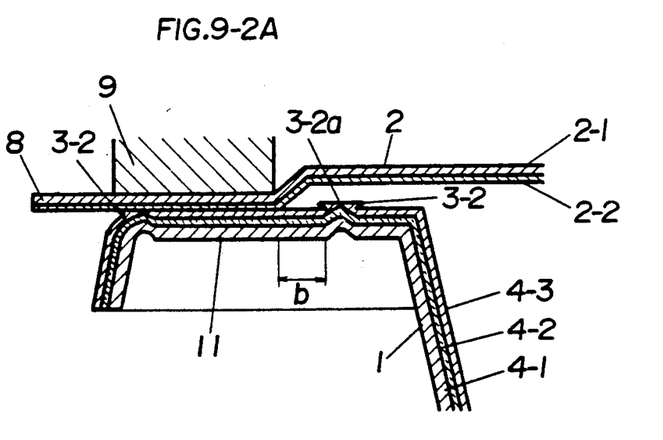
Figures 2B, 4:
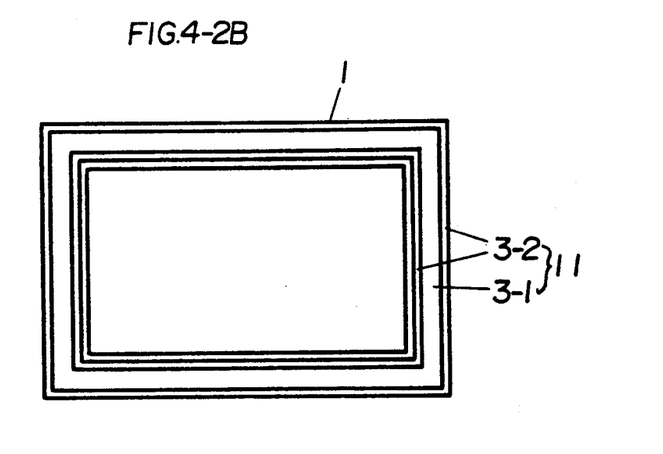
Figures 2B, 9:
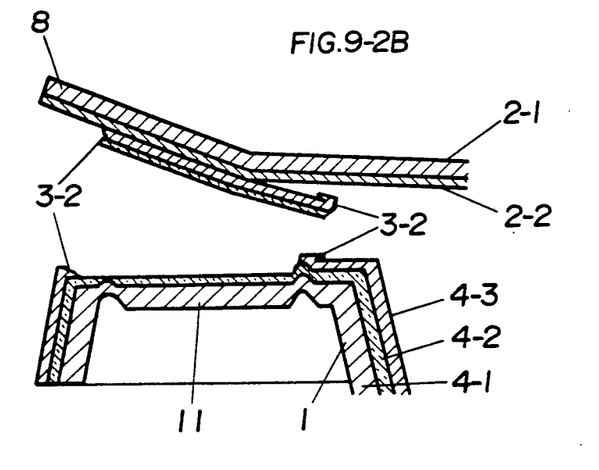
Figures 2C, 4:
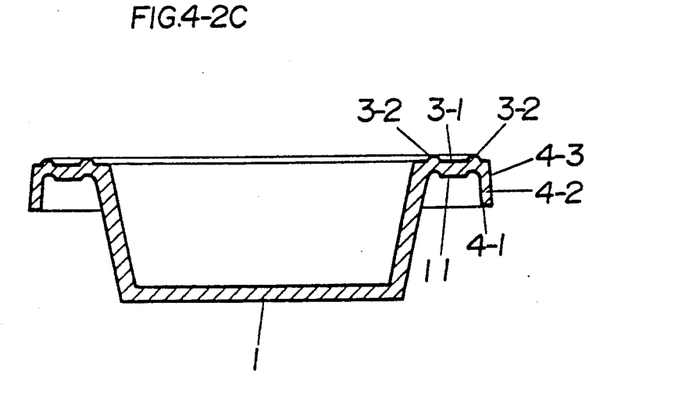
Figures 2C, 9:
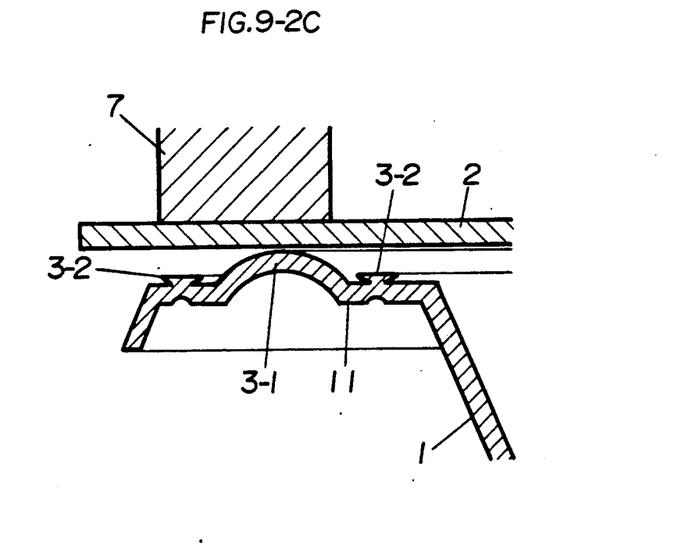
Figures 2D, 4:
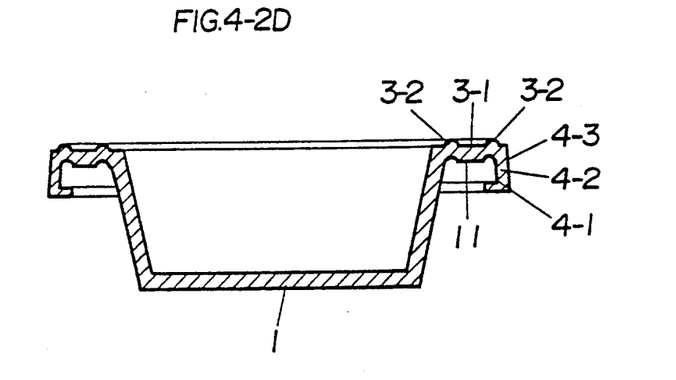
Figures 2E, 4:
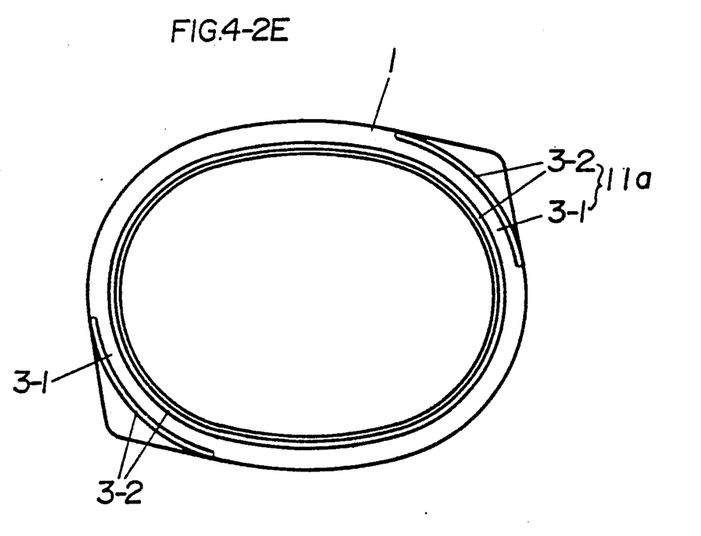
Figure 5:
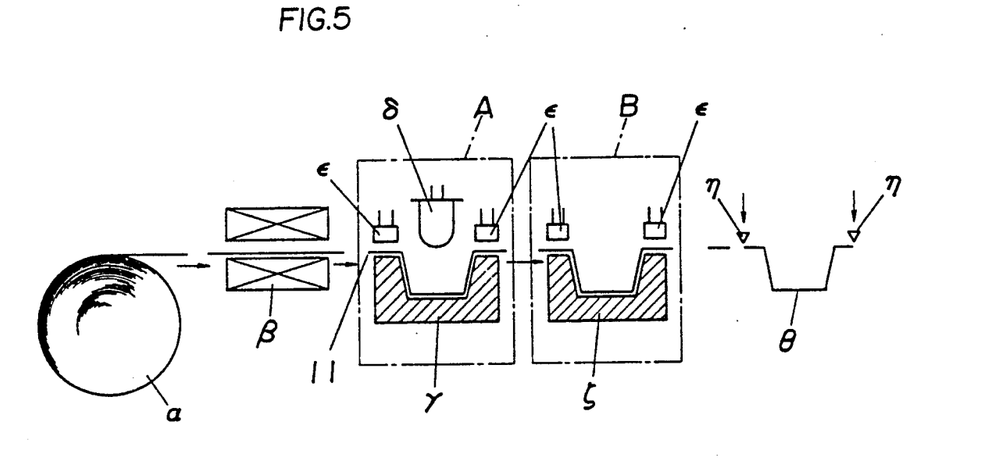
FIGS. 5 and 6 are diagrams of a process for forming containers.

In a container forming process shown in FIG. 5, a multilayer plastic sheet α in accordance with the present invention is formed at a stage A by a thermoforming apparatus such as a vacuum forming machine or a pressure forming machine and by using a mold γ and a plug ⊕ while being sufficiently plasticized at its both surfaces by a sheet softening apparatus β using infrared light or the like. The sheet α is thereby formed into a shape of a container 1, wherein a continuous threadlike protrusion 3-2 is formed on an inner annular portion 3-1 of a flange 11, as shown in FIG. 2—1 or 2—2.

At the same time, the protruding end of the threadlike protrusion 3-2 is pressed with an impressing die ε to about half the height of the formed threadlike protrusion 3-2.

In case it is difficult to perform this operation at the stage A because of the shape of the container or the positional relationship with the plug δ, the formed container sheet is set in a die at a stage B for a separate impressing operation, and the desired portions of the flange 11 is plasticized again and suitably pressed with heat impressing die ε.

Thereafter, the formed sheet is punched by a punching machine ζ to form the final shape of the container, thereby obtaining a container θ reduced in thickness at the predetermined position of the flange 11, i.e., at the threadlike protrusion 3-2 in accordance with the present invention.

Figure 6:
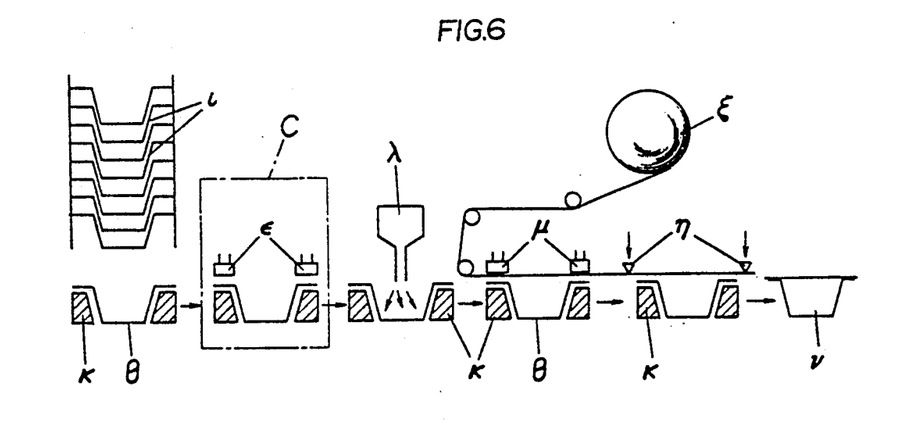

Next, in a cup sealing process shown in FIG. 6, containers θ having continuous threadlike protrusions 3-2 formed on the inner annular portions 3-1 or the flange 11 as shown in FIG. 2—1 or 2—2 are provided on a container receiver κ. The threadlike protrusion 3-2 of each container piece is suitably heat-pressed with a heat impressing die ξ at a stage C before a content stuff is packed, thereby being reduced in thickness. Thereafter, the container is filled with the content stuff by a filling machine λ. Then, the container θ is covered by a cover sheet ε, which is cut by a punching machine η and a sealed container packaging ν with the punched cover sheet ξ is obtained.

Figure 71:
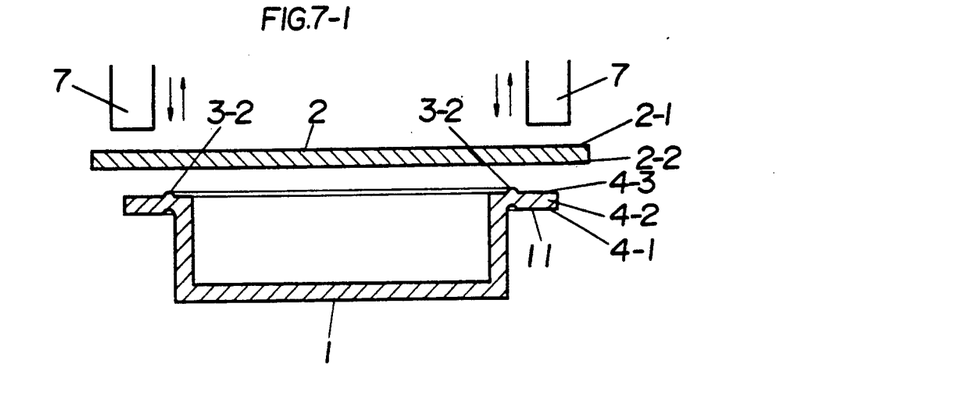
Figure 72:
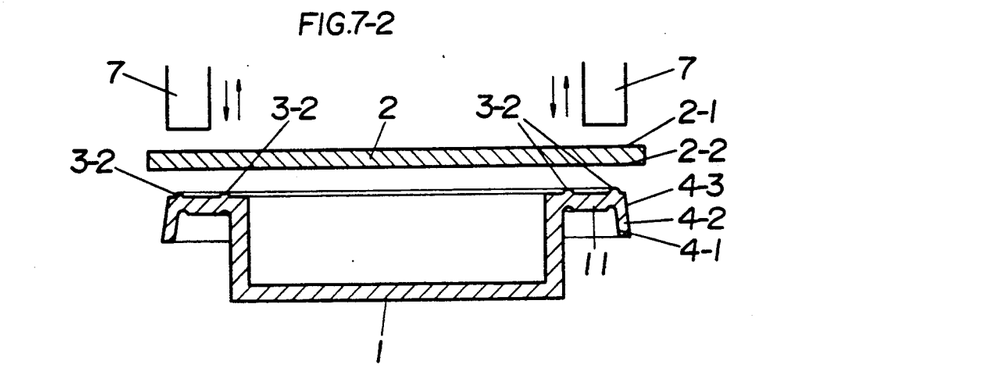

The container 1 having the structure of the present invention is closed by a cover member 2 and by using a heat seal ring 7, as shown in FIGS. 7—1 and 7—2.

Preferably, as illustrated, the heat-sealed portion is spaced apart from the thinner portion 3-2a in the direction of the outer peripheral end of the flange 11 by a distance of 1 mm or more, or more preferably, 2 to 4 mm.

Alternatively, the heat seal between the container 1 having the structure of the present invention may be such that, as shown in FIG. 9—2C, the annular portion 3-1 is upwardly curved between the two threadlike protrusions 3-2 formed on the flange 11 so that the top or the curved portion is higher than the thinner portions 3-2a, that is, the thinner portions 3-2a are positioned below the level of the sealant surface of the cover member, thereby improving the impurity sealing performance.

The effects of the thus-constructed present invention will be described below along with further details.

Figure 8:
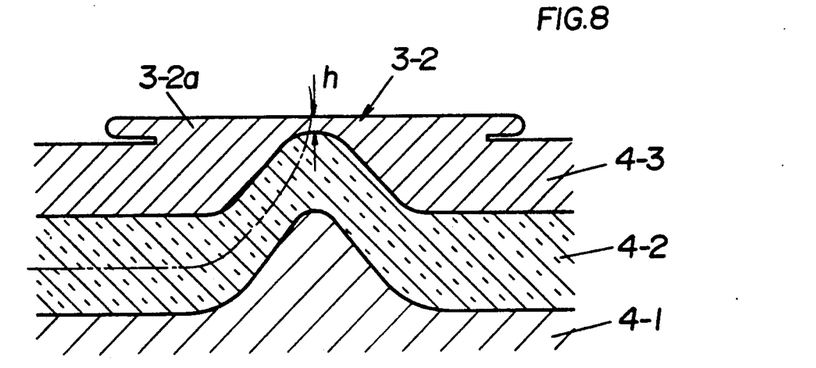
FIG. 8 is an enlarged diagram of the protrusion in a heat-impressed state.

As shown in the enlarged view of FIG. 8, the innermost plastic layer 4-3 of threadlike protrusion 3-2 formed on the inner annular portion 3-1 of the flange 11 is crushed by being heat-impressed so that the distance between the outside surface of the layer 4-3 and the adjacent cohesion-destructive plastic layer 4-2 at the threadlike protrusion 3-2 is reduced, that is, the minimum thickness of the layer 4-3 at this position is h.

The container having the structure or the present invention is capped with the cover member 2 by heat sealing at a distance of b from the heat-pressed portion, as shown in FIGS. 9—1A, 9—2A, or 9—2C.

Referring to FIGS. 9—1A and 9—2A, a part or the whole of the threadlike protrusion 3-2 in the vicinity of the outer periphery of the flange is heat-sealed, while the threadlike protrusion 3-2 located on the inner peripheral side of the flange is not heat-sealed at the distance b from the inner end of the heat-sealed portion.

To open the packaging, an end 8 of the cover member 2 is pulled upward so that the intermediate layer 4-2 having cohesion-destructive properties is broken at the position indicated by the double-dot-dash line in FIG. 8 starting from the outer end of the container flange 11. When the breaking progresses to the thinner portion 3-2a of the innermost layer of the threadlike protrusion 3-2, the innermost layer plastic film 4-3 is torn at the minimum thickness portion h shown in FIG. 8. The packaging is thereby opened.

The cover is opened as shown in FIG. 9—1B or 9—2B, and the progression of tearing of the minimum thickness portion h of the innermost layer 4-3 from the intermediate layer 4-2 can be smoothly progressed by virtue of the fusion bonding between these layers. If these layers are separated, the innermost layer cannot be torn apart smoothly.

In the container structure of the present invention having no rib or curl, heat sealing between the container and the cover at the above-mentioned position is effective because the point of application of a force of separating the sealing portion from the inside is a position 10 shown in FIG. 9—1A, and because the cover member cannot be separated unless it or the container is torn at this position. Thus, protection of the content stuff is remarkably improved.

The container having the structure of the present invention, which include a rib or curl downwardly extending from the outer end of the heat-sealed flange portion which rib or curl is provided to improve the rigidity of the flange or for a design purpose, is also improved in of protecting the content stuff by the effect of heat sealing at the position shown in FIG. 9—2A, i.e., the effect of shifting the point of application of a peeling force from the side of the seal having the structure already proposed so as to reduce the force applied to the weakest portion of the inner threadlike protrusion, thereby increasing the seal strength against the force applied from the inside.

The structure of the present invention shown in FIG. 9—2A enables achievement of the object of the present invention based on reversing the effect of the corresponding structure already proposed.

In accordance with the structure of the present invention, the strength against a peeling force applied from the inside of the container can be set to a value four times or more larger than the strength against a peeling force applied from the outside. For example, in the case of a polypropylene container, the strength against a peeling force applied from the inside of the casing can be set to 4 kg/15 mm while the strength against a peeling force applied from the outside is 1 kg/15 mm. The former is sufficiently higher than 2.3 kg/15 mm which is a standard value of the retort food seal strength in conformity with the law (in Japan).

EXAMPLE 1

A multilayer sheet having a thickness of 800 μm (innermost layer film thickness: 80 μm, intermediate layer thickness: 40 μm, base sheet thickness: 680 μm) was formed by three-layer extrusion of an innermost container layer 4-3 of a non-cohesion-destructive material (a polypropylene having an MFR [melt flow rate at 230° C.]value of 9 g/10 min, a melting point of 160° C., a tensile strength of 450 kg/cm$^2$ and an elongation ratio of 400%), an intermediate layer 4-2 of a cohesion-destructive material (a blended resin consisting of a mixture of a polypropylene having an MFR [melt flow rate at 230° C.]value of 20 g/10 min, a melting point of 150° C., a tensile strength of 300 kg/cm$^2$ and an elongation ratio of 400%, a polyethylene having an MI value of 7, specific gravity of 0.92, a tensile strength of 300 kg/cm$^2$ and an elongation ratio of 500%, and an inorganic filler talc), and a base layer 4-1 (of a polypropylene having an MFR [melt flow rate at 230° C.]value of 2 g/10 min, a melting point of 165° C., tensile strength of 550 kg/cm$^2$ and an elongation ratio of 500%). From this multilayer sheet, the container shown in FIG. 2—1 was formed by a vacuum forming machine with a die γ, having a diameter of 50 mm, a depth of 30 mm, a flange 11 with a width of 10 mm and a threadlike protrusion having a width of 1 mm and a height of 1 mm, which is and continuously formed on the inner annular portion 3-1 of the innermost layer 4-3 of the flange 11. From the same multilayer sheet, the of container shown in FIG. 2—2 was formed by a vacuum forming machine with a die γ, having a diameter of 50 mm, a depth of 30 mm, a flange 11 with a width of 10 mm and a rib downwardly extending from the outer end of the flange 11 by 2 mm and threadlike protrusions each having a width of 0.5 mm a height of 0.5 mm, which is continuously formed at inner and outer positions on the inner annular portion 3-1 of the innermost layer 4-3 of the flange 11.

Next, at a cup sealer stage C such as that shown in FIG. 6, the threadlike protrusion 3-2 was heat-pressed to a height of 0.5 mm with a heat impressing die ε (having a contact surface Teflon-baked for mold release) heated at a temperature of 180° C., thereby forming a minimum thickness portion of the innermost layer plastic film 4-3 having a thickness of 5 μm.

A beef stew was packed in each of the containers having the structures of the present invention, and the container was tightly closed by heat sealing with a cover member formed by dry-laminating with a polyurethane adhesive a biaxially oriented nylon film having a thickness of 15 μm and a polypropylene block copolymer film having a thickness of 60 μm, which block copolymer film is commonly used for retort pouch packaging in this industrial field. The container and the cover member were sealed between the outer peripheral end of the flange and an inner position of the same at a distance of 5 mm from the outer end. The packaging thereby formed was retort-processed at 125° C. for 30 minutes and was cooled. Thereafter, the cover member could be smoothly peeled from the container to open the packaging, as shown in FIG. 9—1B or 9—2B.

No feathering or burr was observed on the peel surface.

The same heat-sealed portion was cut to have a width of 15 mm and the seal strength of this piece was tested by applying a force in each of the inward and outward radial directions of the flange to separate the sealed portion at a peeling speed of 300 mm/min.

As a result of this measurement, the heat-sealed portion exhibited a seal strength of 1.2 kg/15 mm against a peeling force applied from the outside of the flange, while it exhibited a seal strength of 4.5 kg/15 mm against a force applied from the inside of the flange.

This value is greater than 2.3 kg/15 mm which is the standard value of the seal strength of retort food container packagings in conformity with the law.

Reference Example (a) Reference examples based on removing the inorganic talc having an effect of providing cohesion-destructive properties from the intermediate layer 4-2 of the example of the present invention, and another example in which no threadlike protrusion for making the packaging easy to open was formed in the vicinity of the outer end of the heat-sealed flange of the multilayer container were provided and were tested in the same manner as the examples of the present invention. The containers of the reference examples were not broken at the desired breaking position since the intermediate layer has no cohesion-destructive properties. The layers could not be broken uniformly although they were broken at the opening in some way.

(b) Reference examples were provided in which the intermediate layer 4-2 and the innermost layer were made separable in an interface peeling manner by using a composition, e.g., a blend of 50% by weight of high density polyethylene (specific gravity: 0.95) and 50% by weight of ethylene-propylene rubber (specific gravity: 0.88), and were tested in the same manner as the examples of the present invention. The containers of the reference examples were not broken at the desired breaking position as in the case of the reference examples (a) since the intermediate layer was not fusion-bonded to the innermost layer. The peel surfaces were rough and these reference examples were therefore inferior in terms of marketableness.

(c) Further reference examples were provided which were similar to the examples of the present invention but in which the heat-sealed portion extended to a position at a distance of 1 mm from the multilayer container flange portion reduced in thickness. The seal strength was tested with respect to the directions of application of opening forces from the outer and inner peripheries of the flange. It was 1.2 kg/15 mm with respect to each direction, which value is unsatisfactory for protection of the content stuff.

After retort processing at 125° C. for 30 minutes, some leaks through the seals owing to partial peeling were observed.

The easy-opening container packaging in accordance with the present invention is improved in heat resistance and can therefore be applied to food containers which are processed by boiling or retorting for high temperature sterilization, e.g., packagings for curry soup, borsch, beef stew, meat source, pork saute, hamburg, chinese food, boiled white rice, rice boiled and served in a pot, cooked beans (adzuki beans, soybeans) and so on.

What is claimed is:

1. An easy-opening container packaging comprising:

a container for retaining a material therein and having an opening and a flange formed around the opening, said container being formed of a first layer of a non-cohesion-destructive plastic film forming an innermost layer and having a film ply strength of 2.5 Kg/15 mm or larger, a second layer of a cohesion-destructive plastic film bonded to the first layer and having a film ply strength of 0.3 to 2.0 Kg/15 mm, and a base bonded to the second layer, said container having at least one annular protrusion extending upwardly from the flange adjacent the opening, said first layer having a reduced thickness portion with a flat upper surface at the protrusion, said flat upper surface being formed by pressing the first layer, said second layer and said base having thicknesses which do not substantially change throughout the flange with the annular protrusion, and a cover member for covering the opening and the flange of the container, said cover member being firmly bonded to the first layer at the flange outside the annular protrusion so that inner pressure of the container is applied to the connected portion of the cover member and the first layer without affecting to the second layer and the base, and when the cover member is peeled, the second layer is broken by cohesion destruction and the first layer is cut at the reduced thickness portion on the annular protrusion to thereby open the container.

2. An easy-opening container packaging according to claim 1, wherein said container further includes a second annular protrusion extending upwardly from the flange adjacent to an outer periphery of the flange, said first layer having a reduced thickness at the second annular protrusion and firmly bonded to the cover member so that when the cover member is peeled, the first layer is cut at the first and second annular protrusions while the second layer is broken by cohesive destruction.

3. An easy-opening container packaging according to claim 2, wherein said flange is curved upwardly between the annular protrusion and the second annular protrusion to improve sealing ability.

4. An easy-opening container packaging according to claim 11, wherein said container further includes rib extending downwardly from an outer periphery of the flange.

* * * * *